(12) United States Patent
Dube et al.

(10) Patent No.: US 9,921,809 B2
(45) Date of Patent: *Mar. 20, 2018

(54) SCALING A CLOUD INFRASTRUCTURE

(71) Applicant: International Business Machines Corporation, Armonk, NY (US)

(72) Inventors: Parijat Dube, Yorktown Heights, NY (US); Anshul Gandhi, Huntington Station, NY (US); Alexei Karve, Mohegan Lake, NY (US); Andrzej Kochut, Croton-on-Hudson, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/008,552

(22) Filed: Jan. 28, 2016

(65) Prior Publication Data

US 2016/0142265 A1 May 19, 2016

Related U.S. Application Data

(63) Continuation of application No. 14/554,331, filed on Nov. 26, 2014, now Pat. No. 9,300,552.

(Continued)

(51) Int. Cl.
*G06F 9/44* (2006.01)
*H04L 12/24* (2006.01)
*H04L 29/08* (2006.01)
*G06F 9/445* (2018.01)
*G06F 9/455* (2018.01)

(52) U.S. Cl.
CPC .............. *G06F 8/20* (2013.01); *G06F 8/61* (2013.01); *G06F 8/70* (2013.01); *G06F 8/77* (2013.01); *G06F 9/45558* (2013.01); *H04L 41/12* (2013.01); *H04L 41/14* (2013.01); *H04L 41/5006* (2013.01); *H04L 41/5054* (2013.01); *H04L 67/10* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS 7,600,007 B1  10/2009  Lewis
9,092,250 B1 *  7/2015  Hyser ................. G06F 9/45558
(Continued)

OTHER PUBLICATIONS

T. Lorido-Botran et al., "Auto-Scaling Techniques for Elastic Applications in Cloud Environments," University of the Basque Country, Technical Report EHU-KAT-IK-09-12, Sep. 2012, 44 pages.

(Continued)

*Primary Examiner* — Philip Wang
(74) *Attorney, Agent, or Firm* — Louis J. Percello; Ryan, Mason & Lewis, LLP

(57) ABSTRACT

A method for scaling a cloud infrastructure, comprises receiving at least one of resource-level metrics and application-level metrics, estimating parameters of at least one application based on the received metrics, automatically and dynamically determining directives for scaling application deployment based on the estimated parameters, and providing the directives to a cloud service provider to execute the scaling.

16 Claims, 10 Drawing Sheets

Related U.S. Application Data

(60) Provisional application No. 61/916,348, filed on Dec. 16, 2013.

(56) References Cited

U.S. PATENT DOCUMENTS

| | | | |
|---|---|---|---|
| 2008/0034157 | A1 | 2/2008 | Caderet |
| 2011/0087469 | A1 | 4/2011 | Kumar et al. |
| 2011/0173327 | A1* | 7/2011 | Chen .................... G06F 9/5066 709/226 |
| 2011/0191461 | A1* | 8/2011 | Dasgupta ............. G06F 15/173 709/224 |
| 2013/0009579 | A1 | 1/2013 | Henderson et al. |
| 2013/0060933 | A1 | 3/2013 | Tung et al. |
| 2014/0258546 | A1 | 9/2014 | Janssens et al. |

OTHER PUBLICATIONS

Gartner, Inc., "Gartner's Advice for CSPs Becoming Cloud Service Providers," https://www.gartner.com/doc/2155315, Sep. 2012, 6 pages.
SP Home Run Inc., "Cloud Service Provider (CSP) and Inbound Marketing," http://www.sphomerun.com/cloud service-provider-csp, 2013, 4 pages.
Amazon Inc., "Amazon CloudWatch," http://aws.amazon.com/cloudwatch/, 2013, 2 pages.
Softlayer Technologies, Inc., "Server Monitoring & Reporting," http://www.softlayer.com/server-monitoring, 2013, 2 pages.
Rackspace, US Inc., "Solve Problems Faster with Custom Infrastructure Monitoring," http://www.rackspace.com/cloud/monitoring, 2013, 2 pages.
Amazon Inc., "Auto Scaling," http://aws.amazon.com/autoscaling/, 2013, 2 pages.
Cirba Inc., "Explore Cirba by Use Case," http://www.cirba.com/solutions/Cirba-solutions-by-use-case.htm, 2013, 5 pages.
Rightscale, Inc., "Cloud Automation," http://www.rightscale.com/solutions/problems-we-solve/cloud-automation, 2013, 2 pages.
A. Gandhi et al., "AutoScale: Dynamic, Robust Capacity Management for Multi-Tier Data Centers," ACM Transactions on Computer Systems, Article 14, Nov. 2012, 26 pages, vol. 30, No. 4.
B. Urgaonkar et al., "An Analytical Model for Multi-Tier Internet Services and Its Applications," Proceedings of the ACM SIGMETRICS International Conference on Measurement and Modeling of Computer Systems, Jun. 2005, pp. 291-302, vol. 33, No. 1, Banif, Alberta, Canada.
B. Urgaonkar et al., "Dynamic Provisioning of Multi-Tier Internet Applications," Proceedings of the Second International Conference on Autonomic Computing (ICAC), Jun. 2005, pp. 217-228.
openstack.org, "Open Source Software for Creating Private and Public Clouds," http://www.openstack.org/, 2013, 5 pages.
M.H. Kalantar et al., "Weaver: Language and Runtime for Software Defined Environments," IBM Journal of Research and Development, Paper 10, Mar./May 2014, 12 pages, vol. 58, No. 2/3.
Opscode Inc., "How Chef Works," https://www.getchef.com/chef/, 2013, 7 pages.
Softlayer Technologies, Inc., http://www.softlayercom/, 2013, 1 page.
Rubis, "RUBIS: Rice University Bidding System," http://rubis.ow2.org/, Oct. 2009, 2 pages.
Libvirt, "The Virtualization API," http://libvirt.org/, 2013, 1 page.
P. Dube et al., "Performance Evaluation of a Commercial Application, Trade, in Scale-Out Environments," Proceedings of the Fifteenth IEEE International Symposium on Modeling, Analysis, and Simulation of Computer and Telecommunications Systems (MASCOTS), Oct. 2007, pp. 252-259, Istanbul, Turkey.
D. Kumar et al., "Estimating Model Parameters of Adaptive Software Systems in Real-Time," in Run-Time Models for Self-Managing Systems and Applications, ser. Autonomic Systems, D. Ardagna and L. Zhang, Eds. Springer Basel, 2010, pp. 45-71.
Wand Network Research Group, "WITS: Walkato Internet Traffic Storage," http://wand.net.nz/wits/index.php, 2013, 3 pages.
Internet Traffic Archives, "WorldCup98," http://ita.ee.lbl.gov/html/contrib/WorldCup.html, Apr.-Jul. 1998, 5 pages.
Z. Shen et al., "CloudScale: Elastic Resource Scaling for Multi-Tenant Cloud Systems," Proceedings of the 2nd ACM Symposium on Cloud Computing (SOCC), Article No. 5, Oct. 2011, 14 pages, Cascais, Portugal.
N. Roy et al., "Efficient Autoscaling in the Cloud Using Predictive Models for Workload Forecasting," IEEE 4th International Conference on Cloud Computing, 2011, pp. 500-507.
Y. Chen et al., "Minimizing Data Center SLA Violations and Power Consumption via Hybrid Resource Provisioning," Proceedings of the International Green Computing Conference and Workshops (IGCC), Jun. 2011, 9 pages.
A. Krioukov et al., "NapSAC: Design and Implementation of a Power-Proportional Web Cluster," Proceedings of the First ACM SIGCOMM Workshop on Green Networking (Green Networking), Aug. 2010, pp. 15-22, New Delhi, India.
G. Pacifici et al., "Performance Management for Cluster-Based Web Services," IEEE Journal on Selected Areas in Communications, Dec. 2005, pp. 2333-2343, vol. 23, No. 12.
D. Da Silva et al., "Scalability of the Nutch Search Engine," Proceedings of the 21st Annual International Conference on Supercomputing (ICS), Feb. 2007, 17 pages.
M. Woodside et al., "Service System Resource Management Based on a Tracked Layered Performance Model," Proceedings of the Third IEEE International Conference on Autonomic Computing (ICAC), Jun. 2006, pp. 175-184, Dublin, Ireland.
T. Zheng et al., "Performance Model Estimation and Tracking Using Optimal Filters," IEEE Transactions on Software Engineering, May/Jun. 2008, pp. 391-406, vol. 34, No. 3.
L. Zhang et al., "K-Scope: Online Performance Tracking for Dynamic Cloud Applications," USENIX Association, 10th International Conference on Autonomic Computing (ICAC), Jun. 2013, pp. 29-32.
VMware Inc., "VMware vFabric AppInsight Documentation Center," http://pubs.vmware.com/appinsight-5/index.jsp, 2012, 1 page.
Windowsazure, "How to Scale an Application," http://www.windowsazure.com/en-us/manage/services/cloud-services/, 2013, 6 pages.
Google Cloud Platform, "Auto Scaling on the Google Cloud Platform," http://cloud.google.com/resources/articles/auto-scaling-on-the-google-cloud-platform, 2013, 4 pages.
D. Gmach et al., "Adaptive Quality of Service Management for Enterprise Services," ACM Transactions on the Web (TWEB), Article No. 8, Feb. 2008, pp. 1-46, vol. 2, No. 1.
A. Gandhi et al., "Adaptive, Model-Driven Autoscaling for Cloud Applications," USENIX Association, 11th International Conference on Autonomic Computing (ICAC), Jun. 2014, pp. 57-64.
C. Delimitrou et al., "Quasar: Resource-Efficient and QoS-Aware Cluster Management," Proceedings of the 19th International Conference on Architectural Support for Programming Languages and Operating Systems (ASPLOS), Mar. 2014, pp. 127-144.
H. Ghanbari et al., "Optimal Autoscaling in the IaaS Cloud," Proceedings of the 9th International Conference on Autonomic Computing (ICAC), Sep. 2012, pp. 173-178.
E. Kalyvianaki et al., "Self-Adaptive and Self-Configured CPU Resource Provisioning for Virtualized Servers Using Kalman Filters," Proceedings of the 6th International Conference on Autonomic Computing (ICAC), Jun. 2009, pp. 117-126, Barcelona, Spain.
H. Nguyen et al., "AGILE: Elastic Distributed Resource Scaling for Infrastructure-as-a-Service," USENIX Association, 10th International Conference on Autonomic Computing (ICAC), 2013, pp. 69-82.
whatiscloud.com, "What is Cloud Computing? Basic Concepts and Terminology," http://whatiscloud.com/basic_concepts_and_terminology/scaling, 2014, 7 pages.
List of IBM Patents or Patent Applications Treated as Related.

* cited by examiner

100

200

300

BURSTY TRACE SOURCE: WITS

RAMPDOWN TRACE SOURCE: ITA

HILL TRACE SOURCE: WITS

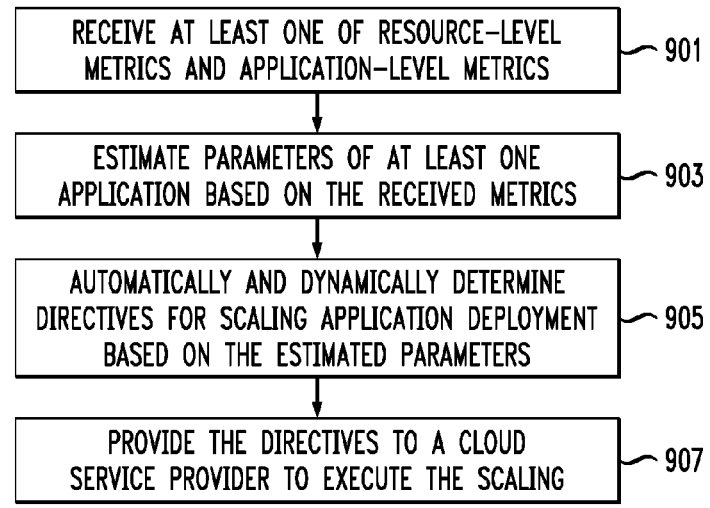
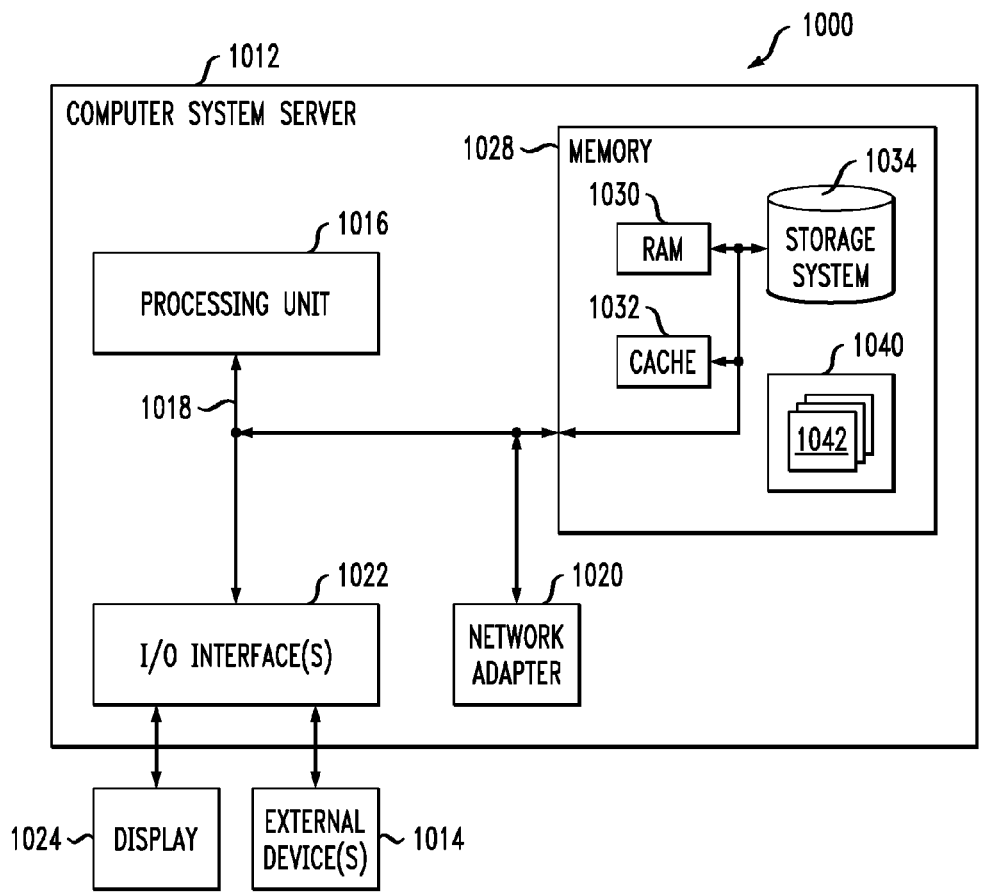

SCALING A CLOUD INFRASTRUCTURE

CROSS-REFERENCE TO RELATED APPLICATIONS

This application is a Continuation of U.S. patent application Ser. No. 14/554,331, filed on Nov. 26, 2014, which claims the benefit of U.S. Provisional Patent Application Ser. No. 61/916,348, filed on Dec. 16, 2013, the contents of which are each herein incorporated by reference in their entireties.

TECHNICAL FIELD

The field generally relates to systems and methods for scaling a cloud infrastructure and, in particular, systems and methods for automatically and dynamically scaling a cloud infrastructure based on parameter estimates.

BACKGROUND

With the advent of cloud computing, many application owners have started moving their deployments into the cloud. Cloud computing offers many benefits over traditional physical deployments including lower infrastructure costs and elastic resource allocation. These benefits can be especially advantageous for applications with a dynamic workload demand. Such applications can be deployed in the cloud based on the current demand, and the deployment can be scaled dynamically in response to changing workload demand. This is in contrast to the expensive and wasteful traditional physical deployments where the application is always provisioned with sufficient resources to handle worst-case workload demand.

While cloud computing is a promising option for application owners, it may not be easy to take full advantage of the benefits of the cloud. Specifically, while cloud computing offers flexible resource allocation, it is up to the customer (application owner) to leverage the flexible infrastructure. That is, the user must decide when and how to scale the application deployment to meet the changing workload demand. Since traditional deployments were often over-provisioned to handle worst-case demands, users never had to worry about dynamically resizing their deployment. However, to fully leverage the advantages of cloud computing, users will now have to worry about dynamically resizing their deployments.

Applications with a dynamic workload demand need access to a flexible infrastructure to meet performance guarantees and minimize resource costs. While cloud computing provides the elasticity to scale the infrastructure on demand, cloud service providers lack control and visibility of user space applications, making it difficult to accurately scale the underlying infrastructure. Thus, the burden of scaling falls on the user. That is, the user must determine when to trigger scaling and how much to scale. Scaling becomes even more challenging when applications exhibit changes in their behavior during run-time.

SUMMARY OF THE INVENTION

In general, exemplary embodiments of the invention include systems and methods for scaling a cloud infrastructure and, in particular, systems and methods for automatically and dynamically scaling a cloud infrastructure based on parameter estimates.

Embodiments of the present invention provide a new cloud service, for example, Dependable Compute Cloud (DC2), which automatically scales an infrastructure to meet user-specified performance requirements, even when multiple user requests execute concurrently. As used herein "Dependable Compute Cloud (DC2)" refers to an implementation of an embodiment of the present invention. While portions of this disclosure are discussed in the context of DC2, it is to be understood that the embodiments of the present invention are not necessarily limited to the specific DC2 implementation, and may cover other implementations incorporating the features and aspects of the disclosed embodiments.

The embodiments of the present invention employ Kalman filtering to automatically learn the (possibly changing) system parameters for each application, allowing for proactively scaling the infrastructure to meet performance guarantees. The embodiments of the present invention are designed for the cloud, are application-agnostic and do not require any offline application profiling or benchmarking, training data, or expert knowledge about the application. An implementation of the embodiments of the present invention, DC2, was evaluated on OpenStack® open source cloud computing software using a multi-tier application under a range of workloads and arrival traces. The experimental results demonstrated a robustness and superiority of DC2 over existing rule-based approaches with respect to avoiding service level agreement (SLA) violations and minimizing resource consumption. It is to be understood that the embodiments of the present invention are not necessarily limited to DC2 and OpenStack®, and may include other implementations.

According to an exemplary embodiment of the present invention, a method for scaling a cloud infrastructure, comprises receiving at least one of resource-level metrics and application-level metrics, estimating parameters of at least one application based on the received metrics, and automatically and dynamically determining directives for scaling application deployment based on the estimated parameters.

According to an exemplary embodiment of the present invention, a computer program product for scaling a cloud infrastructure, comprises a non-transitory computer readable storage medium having program instructions embodied therewith, the program instructions executable by a processor to cause the processor to perform the above method.

According to an exemplary embodiment of the present invention, a system for scaling a cloud infrastructure, comprises a memory, and a memory and at least one processor coupled to the memory, and a modeling and optimization component, executed via the at least one processor, wherein the modeling and optimization component receives at least one of resource-level metrics from a monitoring component and application-level metrics from at least one application, estimates parameters of the at least one application based on the received metrics, and automatically and dynamically determines directives for scaling application deployment based on the estimated parameters.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 9 is a flow diagram of a process for scaling a cloud infrastructure, according to an exemplary embodiment of the present invention.

FIG. 10 depicts a cloud computing node according to an exemplary embodiment of the present invention.

DETAILED DESCRIPTION OF EXEMPLARY EMBODIMENTS

Figure 1:
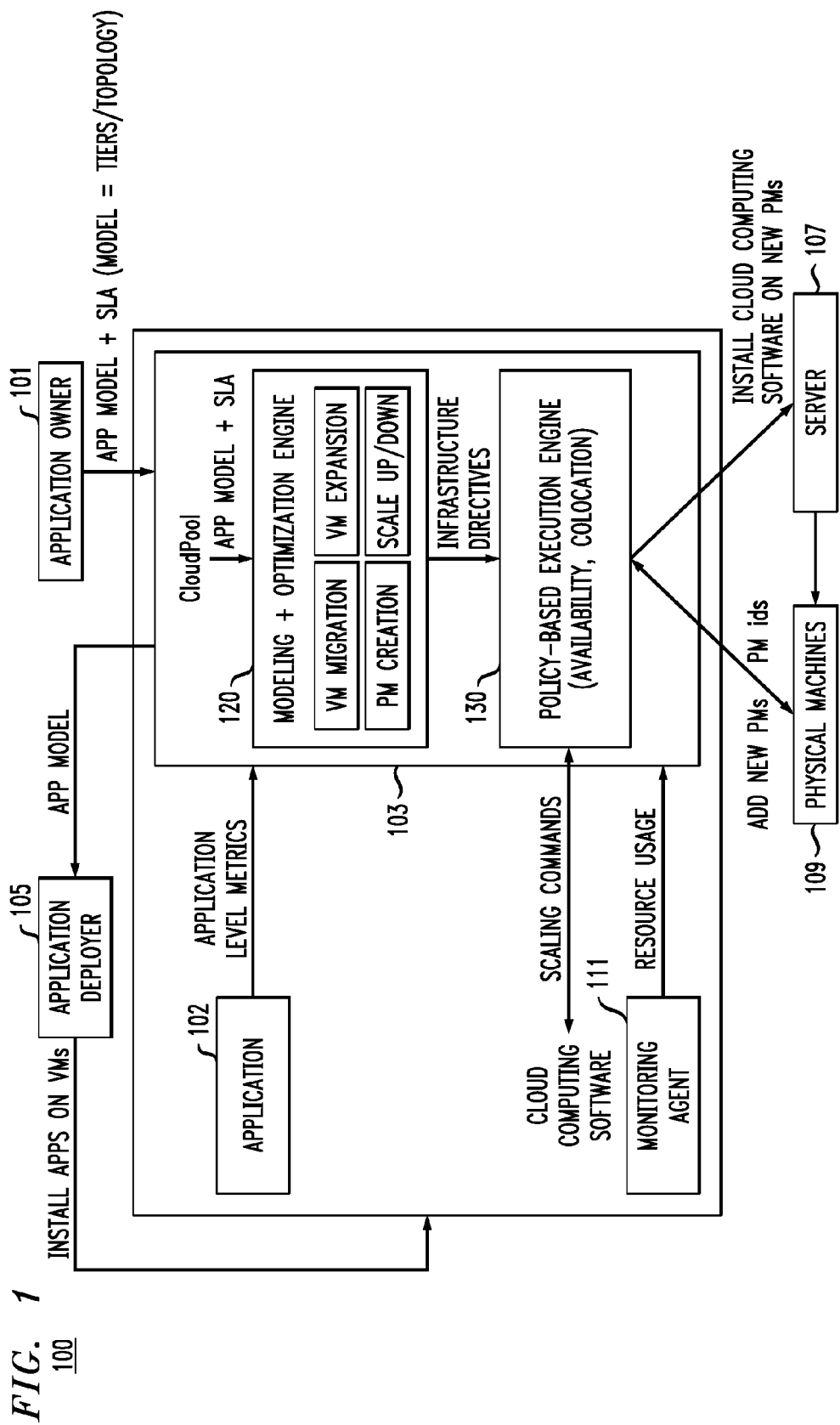
FIG. 1 is a block diagram of a system architecture for scaling a cloud infrastructure, according to an exemplary embodiment of the invention.

Exemplary embodiments of the invention will now be discussed in further detail with regard to systems and methods for scaling a cloud infrastructure and, in particular, systems and methods for automatically and dynamically scaling a cloud infrastructure based on parameter estimates. This invention may, however, be embodied in many different forms and should not be construed as limited to the embodiments set forth herein.

Dynamically sizing a deployment can be challenging for many reasons. From the perspective of a user, who is also an application owner, some of the specific hurdles that complicate the dynamic sizing of an application are: (i) requires expert knowledge about the dynamics of the application, including the service requirements of the application at each tier, and (ii) requires sophisticated modeling expertise to determine when and how to resize the deployment. These hurdles may not be problematic for big businesses that have enough resources to employ a team of experts for dealing with these issues. However, for small and medium businesses (SMB), which may be a targeted customer base for many cloud service providers (CSPs), these hurdles are non-trivial to overcome. In general, SMB users would be more likely to contract a cloud service that manages their dynamic sizing than invest in employing a team of experts. Embodiments of the present invention provide a service to manage dynamic sizing by providing an application-agnostic cloud offering that will automatically, and dynamically, resize user applications to meet performance requirements in a cost-effective manner.

Some existing CSPs offer some sort of assistance to users for elastically sizing their deployments. For example, providing a monitoring service for tracking resource usage is one such solution that is offered (not necessarily for free) by many CSPs. Some such examples include Amazon® CloudWatch, SoftLayer® Nimsoft® Monitoring, and Rackspace® Cloud Monitoring. While such monitoring services provide valuable information to the users, the burden of scaling still lies with the user. That is, the user still requires expert knowledge about the application and the performance modeling expertise to convert the monitored information into scaling actions.

Some CSPs also offer rule-based triggers to help users scale their applications. These rule-based triggers allow the users to specify some conditions on the monitored metrics which, when met, will trigger a pre-defined scaling action. Some of the companies that offer such rule-based triggers include Amazon® Technologies, Inc., CiRBA® Inc., and RightScale®, Inc. Even with the help of rule-based triggers, however, the burden of determining the threshold conditions for the metrics still rests with the user. For example, in order to use a CPU utilization based trigger for scaling, the user must determine the CPU threshold at which to trigger scale-up and scale-down, and the number of instances to scale-up and scale-down. Further, the offered monitoring services only provide resource-level statistics, which are not sufficient for determining the optimal scaling actions required to meet application-level performance guarantees. This is especially true when the user has multiple applications sharing the same infrastructure, in which case the monitored resource-level statistics only provide aggregate information.

CSPs cannot gather all the necessary application-level statistics without intruding into the user-space application. Given the lack of control and visibility into the application, CSPs cannot leverage most of the existing work on dynamic scaling of applications since these works typically require access to the application for measurement and profiling purposes. Further, most of the existing work is not application-agnostic, which is a requirement for a practical cloud service.

The embodiments of the present invention provide systems and methods for a completely automated cloud service (e.g., DC2), that proactively and dynamically scales the application deployment based on user-specified performance requirements. The embodiments of the present invention leverage resource-level and application-level statistics to infer the underlying system parameters of the application(s), and determine the required scaling actions to meet the performance goals in a cost-effective manner. These scaling directives can then be passed on to cloud computing software, for example, OpenStack® open source cloud computing software to execute the scaling. The scaling directives can also be passed on to a policy-based execution engine to ensure colocation and high-availability constraints, if needed.

As used herein, "scaling" can refer to the allocation of resources to handle increased or decreased usage demands, and can include, for example, directives indicating the addition or removal of containers, virtual machines (VMs) or physical machines (PMs), migration of VMs across PMs, and/or a change in the resources allocated to VMs or PMs. Scaling can also refer to resizing user applications to meet changing workload demand.

As used herein, "parameters" can refer to, for example, per-tier service requirements for each request class, per-tier central processing unit (CPU), memory, network, and input/output (I/O) requirements for each request class, per-tier background utilization across all classes, per-class network latency across all tiers, and/or per-tier interference or congestion (due to consolidation) for each request class.

As used herein "deployment" can refer to a number of resources in each tier of a multi-tier topology, for example, a number of VMs in each tier, a number of PMs/tier, a number of containers/tier, a number of cores/tier, memory capacity/tier, network and/or I/O bandwidth/tier.

As used herein "infrastructure" can refer to application deployment. More particularly, infrastructure can refer to an entire end-to-end application deployed in the cloud consisting of multiple tiers, such as a load balancer tier, a web server tier, an application tier, and a database tier. In each tier, the number of VMs/PMs/containers/resources are scaled.

As used herein "workload" can refer to the level of functionality for which a computing environment (e.g., cloud computing environment) is being utilized. For example, the workload can refer to the relative ratio of different request classes. For example, in the Rice University Bidding System (RUBiS) case discussed below, there are multiple workloads, such as Base, MoreWeb, and MoreDB. These workloads differ in the relative ratio of, for example, buy, browse and store request classes. Another example is the workload in a shopping site, such as Amazon.com®, which could consist of customers browsing catalogs, and customers buying and selling merchandise. In this example, workload 1 could be 100% browsing customers, workload 2 could be 50% browsing and 50% buying, etc.

As used herein, "workload demand," can refer to a demand for different classes. For example, workload demand for workload 1 could be 100 requests/second, add workload demand for workload 2 could be 300 requests/second. Workload demand can also be referred to as arrival rate.

Referring to FIG. 1, a system architecture 100 in accordance with an embodiment of the present invention, includes a modeling and optimization engine 120 that internalizes monitored statistics and infers the necessary system parameters for each application 102. While this engine 120 can employ any grey-box or black-box modeling approach, an embodiment of the present invention uses Kalman filtering to infer the system parameters.

As shown in FIG. 1 by lines and/or arrows, the components of the system architecture 100 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

As used herein, "Kalman filtering" can refer to a robust feedback control algorithm that combines monitoring information with a user-specified system model to create accurate estimations of the system state. In accordance with an embodiment of the present invention, Kalman filtering is employed by specifying a generic queuing-theoretic model (details discussed herein below). Since Kalman filtering leverages monitored statistics to come up with estimations, the underlying system model need not be accurate, as can be the case when using queuing theory (or other mathematical modeling techniques) to model complex systems.

In an experimental example, an embodiment of the present invention, DC2, is evaluated via implementation on OpenStack® deployed on top of physical machines 109, such as, for example, SoftLayer® physical machines. It is to be understood that the embodiments of the present invention are not limited to Softlayer® physical machines. A three-tier bidding benchmark, for example, Rice University Bidding System (RUBiS), is employed as the user application 102 and experiments are performed with various workload traces. It is to be understood that the embodiments of the present invention are not limited to RUBiS, and other applications can be used. The results demonstrate that DC2 successfully scales the application 102 in response to changing workload demand without any user input and without any offline profiling. When compared with existing rule-based triggers, the experimental results show that DC2 is superior to such approaches, especially when the workload behavior changes during run-time and when multiple classes of requests execute concurrently. A detailed evaluation of the DC2 implementation is presented herein, also with other use cases, including hypervisor scaling and cost optimization, which demonstrate the versatility of the Kalman filtering approach.

Embodiments of the present invention provide a design and concept of a generic cloud service that dynamically and automatically resizes user applications in the cloud to meet user-specified performance requirements in a cost-effective manner by leveraging resource-level and application-level metrics.

Embodiments of the present invention also propose a Kalman filtering-based modeling approach to automatically infer system parameters for each application, which are typically hidden to the cloud service provider. Using the inferred model, the scaling actions necessary to meet performance guarantees in response to varying workload demand can be determined.

An implementation of an embodiment of the present invention, DC2, on OpenStack® is presented. Experimental examples demonstrate the superiority of the embodiments of the present invention over existing rule-based approaches by managing the sizing of a popular multi-tier benchmark with multiple workload classes.

FIG. 1 illustrates a system architecture 100 for a system for scaling a cloud infrastructure, in accordance with an embodiment of the present invention. As shown in FIG. 1, an application owner 101 (e.g., customer) provides an initial deployment model including the multi-tier topology for one or more applications 102 and the performance SLA requirements to a CloudPool component 103. The CloudPool component 103 is a logical entity that models the application(s) 102 and issues directives (such as virtual machine (VM) scale up/down) required to maintain the performance SLA for the application(s) 102. The initial deployment model can be provided to the CloudPool component 103, for example, in the form of a graph or a configuration file. The customer can optionally select the initial size of the deployment in terms of the numbers of virtual machines (VMs) in each tier.

The application deployer 105 customizes an image for deployment and ties up the endpoints for an application during installation and configuration. The application deployer 105 installs the required applications on the VMs during boot time based on the specific tier to which the VM belongs. In accordance with an embodiment of the present invention, the application deployer 105 can include a script that leverages Chef® recipes (provided by Opscode®, Inc.) or customized VM images and that automates the installation of software on VMs during booting.

In accordance with an embodiment of the present invention, OpenStack® open source cloud computing software can be used as the underlying scalable cloud operating system. It is to be understood that the embodiments of the present invention are not limited to OpenStack® open source cloud computing software, and other cloud computing software can be used. A server 107, for example a Chef® server, provides the automation for driving rapid creation of the OpenStack® environment with the acquisition of initial hardware and the setup of a high availability infrastructure as a service (IaaS) layer. It is to be understood that the embodiments of the present invention are not limited to the Chef® server, and other servers can be used. The VMs for the application(s) 102 are created on an OpenStack® managed private cloud deployment on physical machines 109, for example, SoftLayer® physical machines. It is to be understood that the embodiments of the present invention are not limited to SoftLayer® physical machines, and other physical machines can be used. As the need for additional VMs increases, a new dedicated physical machine (PM) can be ordered and added to the private cloud (e.g., OpenStack® private cloud) via the server 107 (e.g., Chef® server). As the need for additional VMs decreases, PMs can be deprovisioned.

A monitoring agent 111 is responsible for retrieving the resource-level metrics from a hypervisor and application-level metrics from the application(s) 102. The modeling and optimization engine 120 (described in further detail below) takes as input the monitored metrics and outputs a list of directives indicating the addition or removal of VMs or PMs, migration of VMs across PMs, or a change in the resources allocated to VMs or PMs. These directives are passed on to a policy-based execution engine 130 that issues commands to Softlayer® application programming interface (API) via physical machines 109 and/or to OpenStack® API via server 107, that in turn perform the scaling operations. The policy-based execution engine 130 also determines the placement of VMs on the actual PMs based on availability, security, or colocation constraints.

As described above, an open source multi-tier application, for example, RUBiS, was used in the experimental example, but embodiments of the present invention are not limited thereto. RUBiS is an auction site prototype modeled after eBay.com, supporting 26 different classes of web requests such as bid, browse, buy, etc. In the experimental example, the implementation of RUBiS employs Apache® as a frontend web server, Tomcat™ as the Java® servlets container, and MySQL® as the backend database, but embodiments of the invention are not limited thereto. The experiments focused on scaling the Tomcat™ application tier.

RUBiS's benchmarking tool is employed to generate load for the experiments. The benchmarking tool emulates user behavior by defining sessions consisting of a sequence of requests. The think time between requests is exponentially distributed with a mean of 1 second. The number of clients for each experiment was fixed and the load was varied by dynamically changing the composition of the workload mix.

In the experimental example, multiple hypervisors with 8 CPU cores and 8 GB of memory each were employed. The Apache® and MySQL® tiers were each hosted on a 4 CPU VM. The Tomcat™ application tier was hosted on multiple 2 CPU VMs. The provisioning time for a new Tomcat™ VM was about 30-40 seconds. The boot time was optimized by creating a customized VM image for the Tomcat™ tier which is pre-installed with the required application tier software. Once the new VM was online, automated scripts configure the Java® database connectivity (JDBC) with the Internet protocol (IP) address of the MySQL® database and update the load balancer on the Apache® web server to include the new Tomcat™ VM. This allows the application tier to be scaled dynamically without any manual intervention.

In accordance with an embodiment of the present invention, the monitoring agent 111 can include a Libvirt™ virtualization API to collect VM CPU utilization statistics from each hypervisor periodically. For the application-level metrics, there can be periodic communication with the frontend (e.g., Apache® frontend) to fetch the web logs. These log files can them be parsed to compute a request rate and response time per request class. An alternative monitoring service can also be implemented that analyzes the request URLs directed at the application (e.g., RUBiS application) to compute the request rate and response time. This alternative service does not need to communicate with the application(s) 102. A user can choose to provide the application-level metrics directly (for example, using a representational state transfer (REST) call). The monitoring interval is set to, for example, 10 seconds, but the embodiments of the present invention are not limited thereto. The collected statistics are then provided as input to the modeling and optimization engine 120.

In accordance with an embodiment of the present invention, the execution engine 120 is primarily responsible for issuing commands for VM and PM scaling based on the scaling directives received from the modeling engine 120. According to an embodiment, the execution engine can issue the VM and PM scaling commands to OpenStack® and SoftLayer®, respectively, (or to other software/programs) only after two successive scaling directives from the modeling engine 120.

The execution engine 130 is also responsible for placing the new VMs on specific hypervisors. This mapping can be enabled by a scheduler (e.g., OpenStack® Nova™ scheduler) via a host aggregate and availability zone directives. Host aggregates, which can be defined as logical cloud partitions, can be used to place one set of VMs (e.g., Apache® and MySQL® VMs) on one hypervisor and another set of VMs (e.g., Tomcat™ VMs) on a different set of hypervisors.

In accordance with an embodiment of the present invention, the modeling and optimization engine 120 uses a queuing-network model to approximate a multi-tier cloud application. However, since the user application(s) 102 are not accessed to derive the parameters of the model, a Kalman filtering technique is used to infer these unobservable parameters. Further, by leveraging the current monitoring information via the monitoring agent 111, the model is refined to dynamically adapt to any changes in the system. By employing the Kalman filter to leverage the actual monitored values, dependence on the approximate queuing model of the system is minimized.

The queuing model and Kalman filtering technique is described below, followed by an analysis of the modeling and optimization engine 120, and an explanation of how the modeling and optimization engine 120 determines the required scaling actions for SLA compliance.

Figure 2:
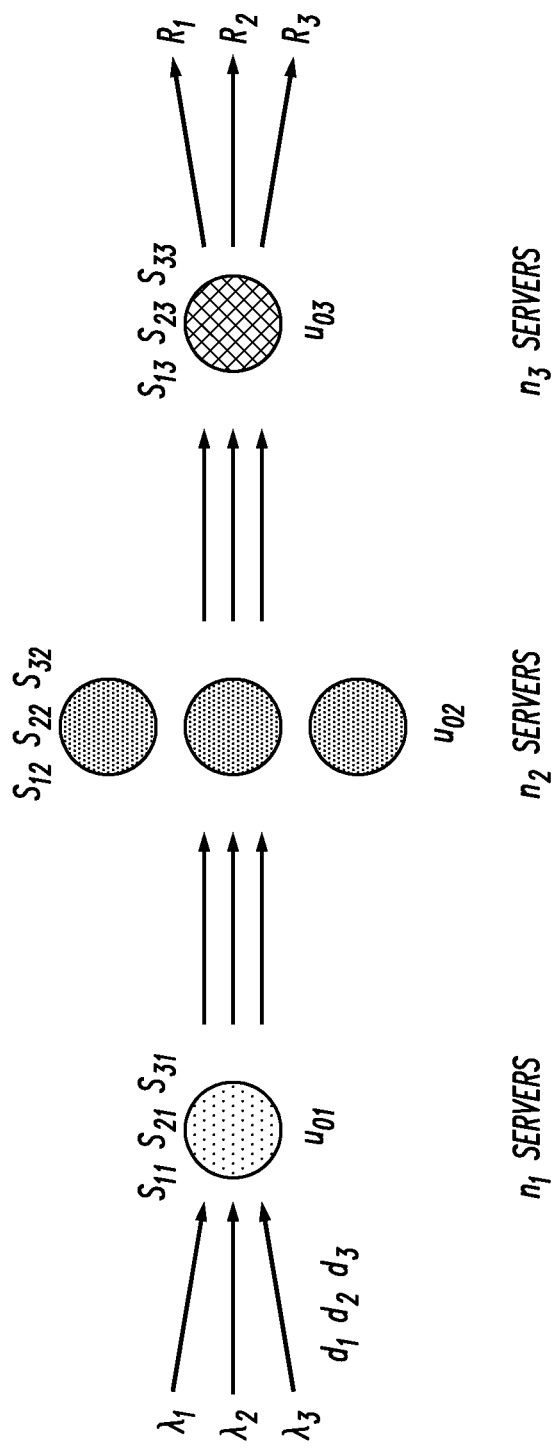
FIG. 2 shows a queuing-network model of a generic three-tier system according to an exemplary embodiment of the invention.

FIG. 2 shows a queuing-network model 200 of a generic three-tier system with each tier $n_1$, $n_2$, and $n_3$ representing a collection of homogeneous servers. It is assumed that the load at each tier is distributed uniformly across all the servers in that tier. The system parameters are: $\lambda_i$, arrival rate of class i; $R_i$, response time for class i; $d_i$, network latency for class i; $u_{0j}$, background utilization for tier j; $S_{ij}$: service time of class i at tier j.

The system is driven by a workload including i distinct request classes, each class being characterized by its arrival rate, $\lambda_i$, and end-to-end response time, $R_i$. Let $n_j$ be the number of servers at tier j. With homogeneous servers and perfect load-balancing, the arrival rate of requests at any server in tier j is $\lambda_{ij}:=\lambda_i/n_j$. Since servers at a tier are identical, for ease of analysis, each tier is modeled as a single representative server. The representative server at tier j is referred to as tier j. Let $u_j \in [0,1)$ be the utilization of tier j. The background utilization of tier j is denoted by $u_{0j}$, and models the resource utilization due to other jobs (not related to the workload) running on that tier. The end-to-end network latency for a class i request is denoted by $d_i$. Let $S_{ij}(\geq 0)$ denote the average service time of a class i request at tier j. Assuming we have Poisson arrivals and a processor-sharing policy at each server, the stationary distribution of the queuing network is known to have a product-form for any general distribution of service time at servers. Under the product-form assumption, the following analytical results from queuing theory are:

$$u_j = u_{0j} + \sum_i \lambda_{ij} S_{ij}, \forall j \quad (1)$$

$$R_i = d_i + \sum_j \frac{S_{ij}}{1-u_j}, \forall i \quad (2)$$

While $u_j$, $R_i$ and $\lambda_i$, $\forall i, j$, can be monitored relatively easily and are thus observable, the parameters $S_{ij}$, $u_{0j}$, and $d_i$ are non-trivial to measure and are thus deemed unobservable. While existing work on auto-scaling typically obtains these values by directly accessing or modifying application software (for example, by parsing the log files at each tier), the proposed application-agnostic cloud service in accordance with an embodiment of the present invention does not encroach the user's application space. Instead, a parameter estimation technique is employed (e.g., Kalman filtering) to derive estimates for the unobservable parameters of an application. Further, since the system parameters can dynamically change during runtime, the Kalman filter (or other estimation technique) is employed as an on-line parameter estimator to continually adapt the parameter estimates.

While the product-form is shown to be a reasonable assumption for tiered web services, according to an embodiment, it is only used as an approximation for our complex system. By employing the Kalman filter (or other estimation technique) to leverage the actual monitored values, the dependence on the approximation is minimized.

In connection with Kalman filtering, for a three-class, three-tier system (i.e., i=j=3), let $z:=(u_1,u_2,u_3,R_1,R_2,R_3)^T$=h (x) and $x=(u_{01},u_{02},u_{03},d_1,d_2,d_3,S_{11},S_{21},S_{31},S_{12},S_{22},S_{32},S_{13},S_{23},S_{33})^T$. Note that z is a 6-dimensional vector whereas x is a 15-dimensional vector. The problem is to determine the unobservable parameters x from measured values of z and $\lambda=(\lambda_1,\lambda_2,\lambda_3)$.

According to an embodiment, Kalman filtering is used to estimate the unobservable parameters. The dynamic evolution of system parameters can be described through the following Kalman filtering equations:

System State $x(t)=F(t)x(t-1)+w(t)$,

Measurement Model $z(t)=H(t)x(t)+v(t)$, where F(t) is the state transition model and H(t) is the observation model mapping the true state space into the observed state space. In our case, F(t), $\forall t$, is the identity matrix. The variables $w(t) \sim N(0,Q(t))$ and $v(t) \sim N(0,R(t))$ are process noise and measurement noise, which are assumed to be zero-mean, multi-variate Normal distributions with covariance matrices Q(t) and R(t) respectively. The matrices Q(t) and R(t) are not directly measurable, but can be tuned via best practices.

Since the measurement model z is a non-linear function of the system state x (see Eqns. (1) and (2)), the Extended Kalman filer is used with $$H(t) = \left[\frac{\partial h}{\partial x}\right]_{x(t)},$$

which for our model is a 6×15 matrix with $$H(t)_{ij} = \left[\frac{\partial h_i}{\partial x_j}\right]_{x(t)}.$$

Since x(t) is not known at time t, it is estimated by $\hat{x}(t|t-1)$, which is the a priori estimate of x(t) given all the history up to time t−1. The state of the filter is described by two variables $\hat{x}(t|t)$ and P(t|t), where $\hat{x}(t|t)$ is the a posteriori estimate of state at time t and P(t|t) is the a posteriori error covariance matrix, which is a measure of the estimated accuracy of the system state.

The Kalman filter has two phases: Predict and Update. In the predict phase, a priori estimates of state and error matrix are calculated. In the update phase, these estimates are refined using the current observation to get a posteriori estimates of state and error matrix. The filter model for the predict and update phases for our 3-class, 3-tier model is given by:

Predict:

$\hat{x}(t|t-1)=F(t)\hat{x}(t-1|t-1)$ $P(t|t-1)=F(t)P(t-1|t-1)F^T(t)+Q(t)$

Update:

$y(t)=z(t)-h(\hat{x}(t|t-1))$ $$H(t) = \left[\frac{\partial h}{\partial x}\right]_{\hat{x}(t|t-1)}$$

$S(t)=H(t)P(t|t-1)H^T(t)+R(t)$ $K(t)=P(t|t-1)H^T(t)S^{-1}(t)$ $\hat{x}(t|t)=\hat{x}(t|t-1)+K(t)y(t)$ $P(t|t)=(I-K(t)H(t))P(t|t-1)$ The above filter model is employed by seeding our initial estimate of $\hat{x}(t|t-1)$ and P(t|t−1) with random values, then applying the Update equations by monitoring z(t) to get $\hat{x}(t|t)$ and $P(t|t)$, and finally using the Predict values to arrive at the estimated $\hat{x}(t|t-1)$ and $P(t|t-1)$. This process is continued iteratively at each 10 second monitoring interval to derive new estimates of the system state.

Figure 3:
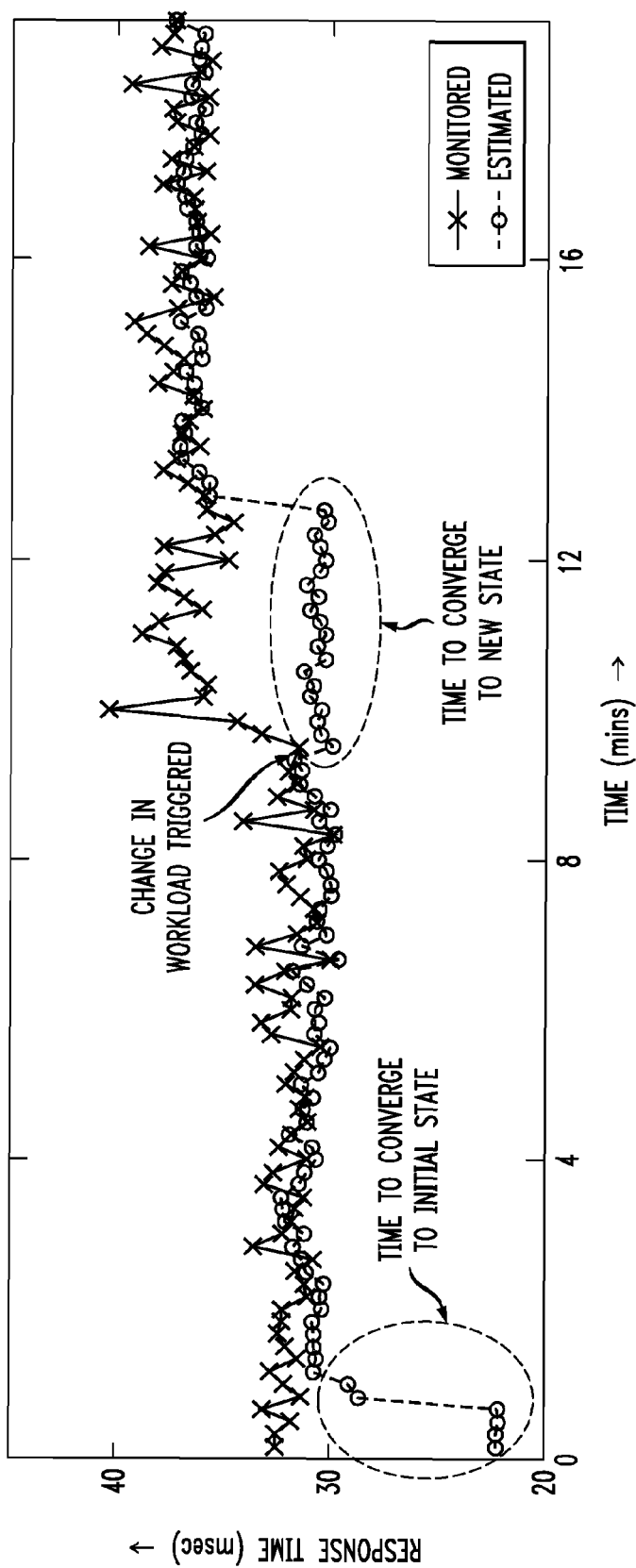
FIG. 3 is a graph illustrating accuracy and convergence of the Kalman filtering technique when employed in experimental examples according to an exemplary embodiment of the present invention.

The Kalman filtering technique described above provides estimates of the unobservable system parameters $S_{ij}$, $u_{0j}$, and $d_i$. These estimates are used, along with Eqns. (1) and (2), to predict the future values of $u_j$ and $R_i$. FIG. 3 is a graph illustrating accuracy and convergence of the Kalman filtering technique when employed in experimental examples according to an embodiment of the present invention. The solid line with crosses shows the monitored values of response time for a specific class of requests in the three-tier application described herein. Here, the monitoring interval is 10 seconds. The dashed line with circles shows estimated values for the predicted response time based on the Kalman filtering technique in accordance with an embodiment of the present invention. It initially takes about a minute for the estimates to converge. After convergence, the estimated values are in very good agreement with the monitored values, thus validating the techniques of the embodiments of the present invention and highlighting their accuracy. Since the current monitored values of z and λ are leveraged, the estimated system parameters can adapt to changes in the application. In order to demonstrate this ability, a change in the workload is triggered at about the 10-minute mark (shown in FIG. 3) which causes the response time to increase. The change in the workload causes a change in the service time of the requests. The Kalman filter detects this change based on the monitored values, and quickly adapts (in about 2 minutes) its estimates to converge to the new system state, as shown in FIG. 3.

In sum, initially, the Kalman filter takes about a minute to accurately capture the system parameters. After a dynamic change the workload mix at about the 10 minute mark, the Kalman filter takes about 2 minutes to capture the new system parameters and adapts its estimation accordingly.

The estimated values of the system state are used to compute the required scaling actions for the cloud service (e.g., DC2) in accordance with an embodiment of the present invention. Specifically, given a response time SLA, Eqns. (1) and (2) are used to determine the minimum $n_j$ required to ensure SLA compliance. Note that $\lambda_{ij} = \lambda_i/n_j$ in Eqn. (1). Auto-scaling abilities of the Kalman filtering-based approach according to an embodiment is discussed herein below.

Figure 4A:
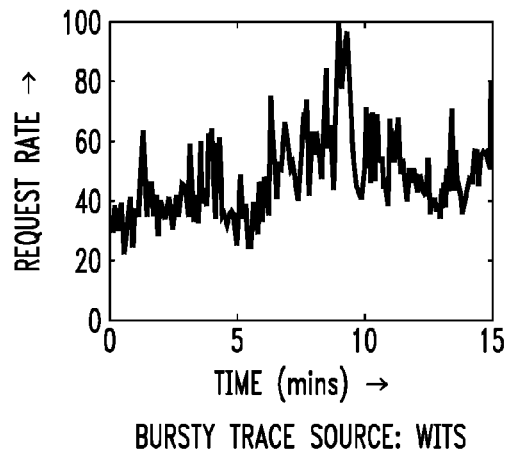
FIGS. 4(a), (b) and (c) show graphs illustrating normalized traces for experimental examples according to an exemplary embodiment of the present invention.
Figure 4B:
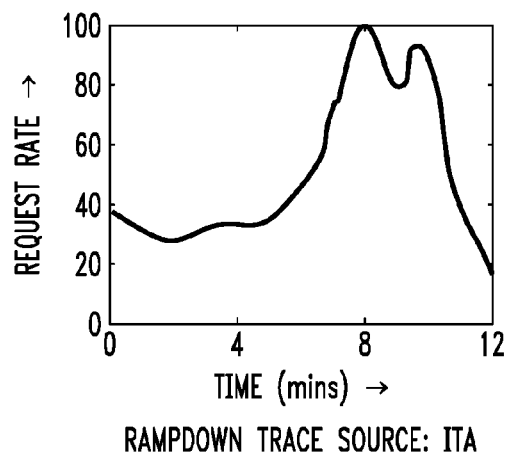
Figure 4C:
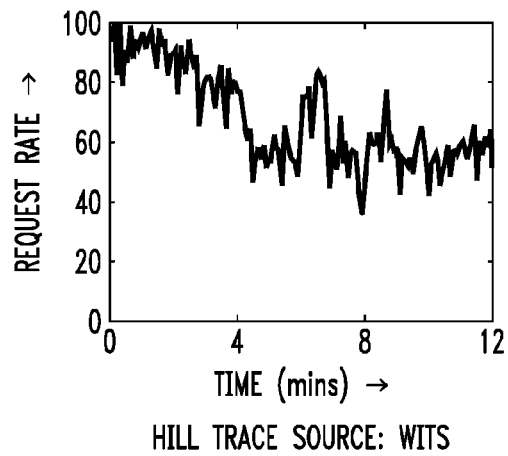

A scaling policy of the cloud service according to an embodiment of the present invention is evaluated in various settings using the RUBiS application. Traces from the Waikato Internet Traffic Storage (WITS) traffic archive and the WorldCup98 dataset from the Internet Traffic Archive (ITA) were used to drive the load generator. The WITS archive contains a large collection of internet traces from Internet service providers (ISPs) and university networks. The WorldCup98 dataset contains 3 months' worth of requests made to the 1998 World Cup website. The traces were scaled to fit the deployment. The normalized traces are shown in FIG. 4.

Several workloads were used to evaluate the service (e.g., DC2) in accordance with an embodiment of the present invention. The workloads were generated by modifying the RUBiS client to create different mixes of web requests that stress different components and tiers of the system.

As used herein, "Base" represents a default workload mix and stresses the application tier. Unless stated otherwise, we Base is used as the workload.

As used herein, "MoreDB" uses the same mix of requests as Base, but contains a higher fraction of requests that stress the database.

As used herein, "MoreApp" is derived from Base and includes additional classes of requests that stress the application tier.

As used herein, "MoreWeb" is derived from Base and replaces some of the requests that stress the database with requests that stress the web tier.

In the experimental examples, the response time of browse requests was focused on since customers often base their web experience based on how long it takes to browse through online catalogues. The target response time for the browse requests was less than 40 ms, on average, for every 10 second monitoring interval. This goal is more challenging than requiring the response time be less than 40 ms over an entire length of the experiment. The response time SLA for all other classes was set to 100 ms. A secondary goal was to minimize the number of application tier VMs employed during the experiment. The following two metrics were considered: V, the percentage of time that the response time SLA was violated, and K, the average number of application tier VMs used during the experiment. For each experiment, we compare the service according to an embodiment of the present invention was compared with the following two policies:

"STATIC-OPT" refers to the best static provisioning policy that maintains a fixed number of application tier VMs throughout the experiment. STATIC-OPT is determined by experimenting with different number of application VMs and choosing the one which results in the lowest value of K with V=0.

"THRES(x,y)" refers to a rule-based provisioning policy that adds one application VM when the average application tier utilization exceeds y % for successive intervals and removes one application VM when the average utilization falls below x % for successive intervals. In practice, it suffices to consider two successive intervals for the scaling decisions, just as in the case of an embodiment of the present invention.

Figure 5A:
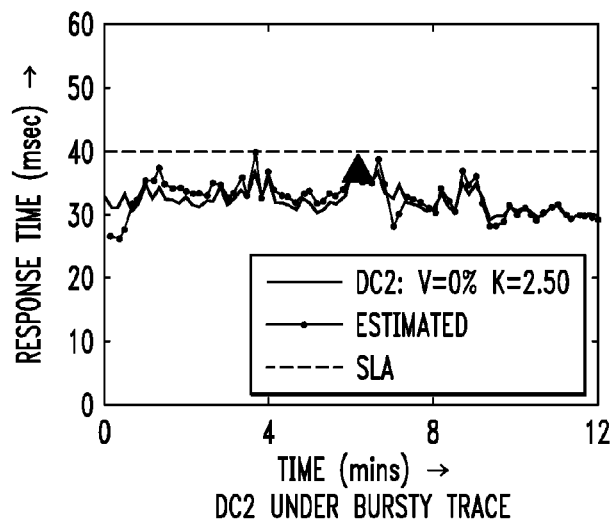
FIG. 5(a) is a graph showing the experimental results for an embodiment of the present invention under the Bursty trace using the default Base workload.

FIG. 5(a) shows the experimental results for an embodiment of the present invention under the Bursty trace using the default Base workload. The figure shows the monitored (black solid line) and estimated (dotted line) response time under an embodiment of the present invention, along with the response time SLA (dashed line). The response time for the browse requests is only shown. The monitored response time under an embodiment of the present invention is below the SLA throughout the experiment. The up and down triangles represent the points in time when a scale-up and scale-down action was triggered, respectively. As mentioned above, a scaling is triggered based on two successive recommendations from the Kalman filter. Observe that the estimated response time is typically in agreement with the monitored response time. This indicates the accuracy of the Kalman filtering technique in accordance with an embodiment of the present invention. However, there is a difference between the estimated and monitored response time for the first few intervals. This is because it takes some time for the Kalman filter to calibrate its model based on the monitored data, as discussed above.

Figure 6A:
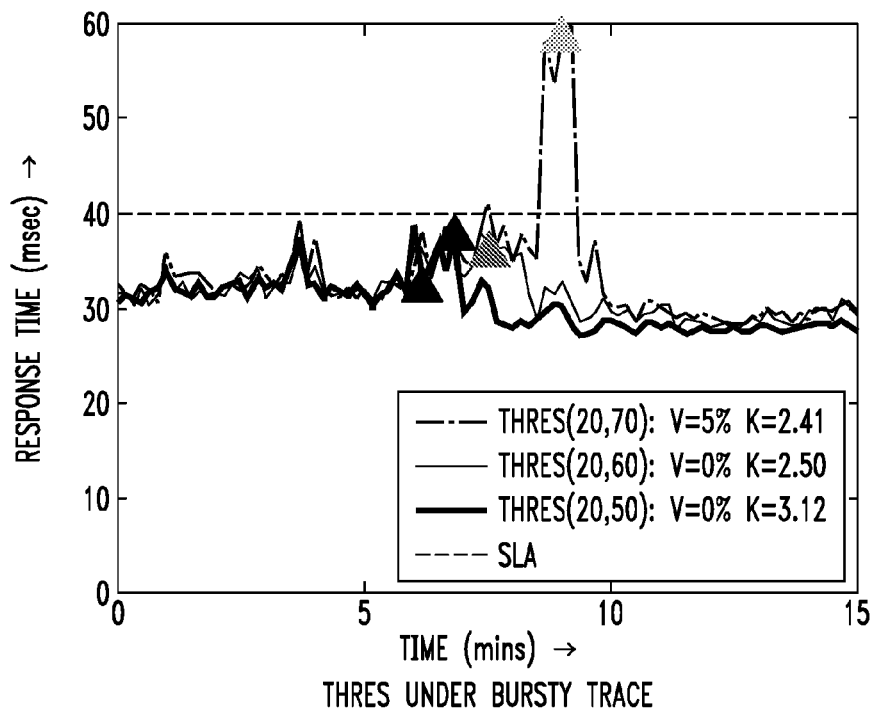
FIG. 6(a) is a graph showing different settings for THRES with x=20% under the Bursty trace.
Figure 6B:
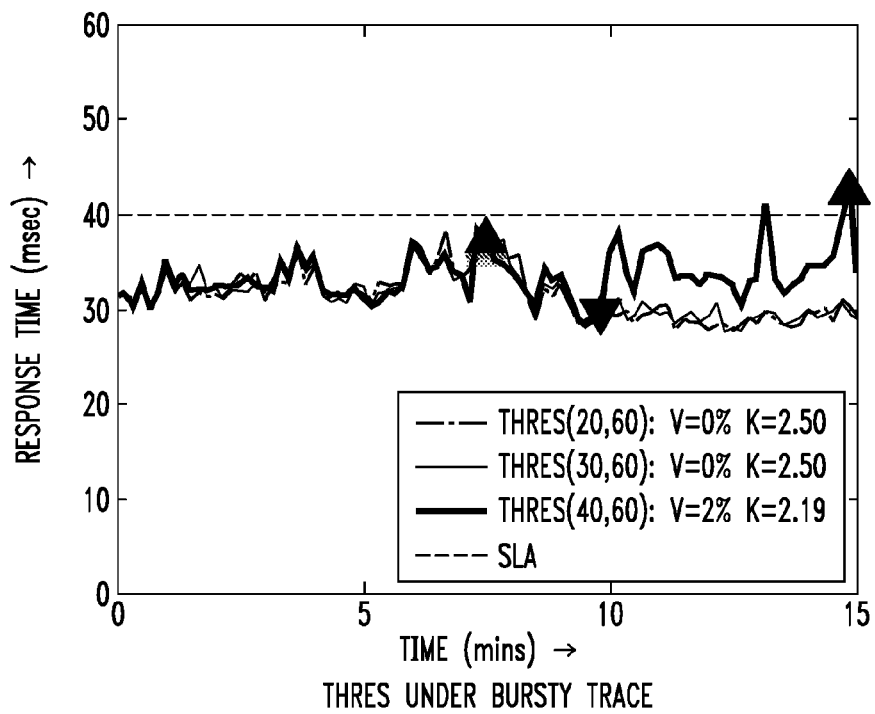
FIG. 6(b) is a graph showing results of experimentation with different x values for THRES with y=60% under the Bursty trace.

Using the THRES(x,y) policy in practice can be complicated since it requires finding the right values for x and y. To find the optimal THRES policy, according to an embodiment, start with x=20% and y=70%, and then iterate via trial-and-error until the optimal values are found. FIG. 6(a) shows different settings for THRES with x=20% under the Bursty trace. As can be seen, y=60% results in the lowest K with V=0. FIG. 6(b) shows results of experimentation with different x values with y=60%. Based on the results, it was concluded that THRES(30,60) (or THRES(20,60)) is the optimal THRES policy for the Bursty trace.

Table I summarizes the performance of the different policies for the Bursty trace using the Base workload.

TABLE I

| | Metric | |
|---|---|---|
| Policy | V | K |
| STATIC-OPT | 0% | 3.00 |
| THRES(20,70) | 5.05% | 2.41 |
| THRES(20,60) | 0% | 2.50 |
| THRES(20,50) | 0% | 3.12 |
| THRES(30,60) | 0% | 2.50 |
| THRES(40,60) | 2.02% | 2.19 |
| DC2 | 0% | 2.50 |

For the STATIC-OPT policy, it was found that a minimum of 3 VMs were needed to ensure V=0. Based on these results, the dynamic policies, THRES(30,60) and DC2, result in lower resource consumption than STATIC-OPT. While both DC2 and THRES result in zero SLA violations and low resource consumption under the Bursty trace, THRES requires a relatively large amount of experimentation and calibration to achieve the desired performance.

Figure 5B:
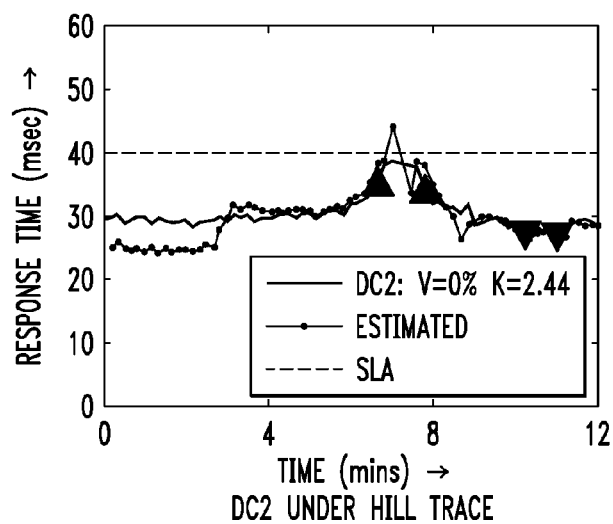
FIG. 5(b) is a graph showing the experimental results for an embodiment of the present invention under the Hill trace using the default Base workload.
Figure 5C:
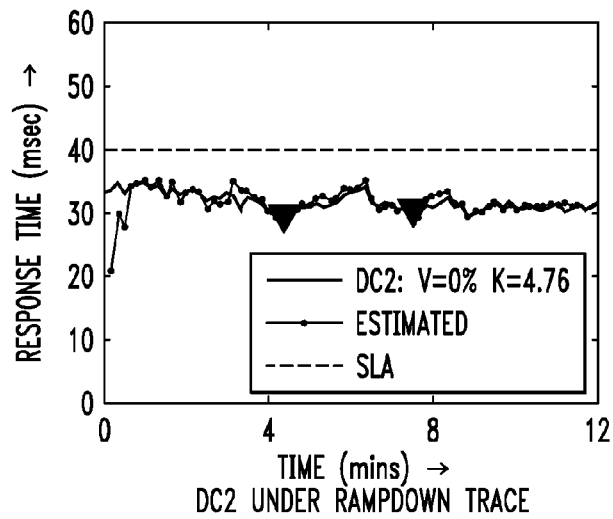
FIG. 5(c) is a graph showing the experimental results for an embodiment of the present invention under the Ramp-down trace using the default Base workload.

The comparison under different traces, namely, the Hill trace and the Rampdown trace was also considered. FIGS. 5(b) and 5(c) show experimental results for an embodiment of the present invention (e.g., DC2) under these traces. It is again observed that the (monitored) response time under DC2 is below the SLA throughout the experiment for both traces. The algorithm for DC2 is not changed between experiments. DC2 automatically adapts (based on the Kalman filtering technique discussed above) to the different traces and takes corrective actions to ensure that the SLA is not violated.

The THRES(30,60) policy is no longer optimal for the Hill or Rampdown traces. For the Hill trace, it was found that THRES(30,50) is optimal, because the Hill trace exhibits a steep rise in load, requiring more aggressive scale-up. For the Rampdown trace, it was found that THRES(40,60) is optimal, because the Rampdown trace exhibits a gradually lowering request rate, allowing for more aggressive scale-down. Not using the right THRES policy for each trace can result in expensive SLA violations or increased resource consumption, as can be seen from the results in Table II. Table II shows a comparison of the different policies for each of the traces using the Base workload for each trace. The optimal policies' values are displayed in bold.

TABLE II

| | Trace | | | | | |
|---|---|---|---|---|---|---|
| | Bursty | | Hill | | Rampdown | |
| | | | Metric | | | |
| Policy | V | K | V | K | V | K |
| STATIC-OPT | 0% | 3.00 | 0% | 4.00 | 0% | 6.00 |
| THRES(30, 60) | 0% | 2.50 | 6.66% | 2.56 | 0% | 6.00 |
| THRES(30, 50) | 0% | 2.79 | 1.21% | 2.72 | 0% | 6.00 |
| THRES(40, 60) | 2.02% | 2.19 | 15.87% | 2.13 | 0% | 4.62 |
| DC2 | 0% | 2.50 | 0% | 2.44 | 0% | 4.76 |

It is thus concluded that DC2 is more robust to changes in arrival patterns than THRES.

The performance of all of the policies under different workload settings was compared and evaluated. Table III shows the experimental results for various policies for different workload mixes under the Bursty trace.

TABLE III

| | Workload | | | | | | | |
|---|---|---|---|---|---|---|---|---|
| | Base | | MoreDB | | MoreApp | | MoreWeb | |
| | | | | Metric | | | | |
| Policy | V | K | V | K | V | K | V | K |
| STATIC-OPT | 0% | 3.00 | 0% | 4.00 | 0% | 3.00 | 0% | 3.00 |
| THRES (30, 60) | 0% | 2.50 | 3.06% | 3.40 | 2.04% | 2.98 | 0% | 3.00 |
| DC2 | 0% | 2.50 | 0% | 3.66 | 0% | 2.94 | 0% | 2.87 |

THRES(30,60) was chosen since it is the optimal THRES policy under the Bursty trace for the Base workload. As can be seen from Table III, DC2 results in zero violations for all workloads without requiring any changes in configuration between experiments. This is because the Kalman filtering technique used by DC2 quickly adapts to changes in workload (as shown in FIG. 3 and discussed above). In contrast, THRES can result in severe SLA violations and/or increased resource consumption when the underlying workload changes. In particular, THRES(30,60) results in SLA violations when using the MoreDB and MoreApp workloads. For the MoreDB workload, since there is increased load in the database tier, more aggressive scaling of the application tier is required (for the same CPU utilization) to meet the end-to-end response time SLA. Since THRES is ignorant of the dependencies between tiers, it does not take the required corrective actions to ensure SLA compliance. According to an embodiment of the present invention, DC2, on the other hand, infers the system parameters from the monitored values and takes the necessary scaling actions that result in zero violations. Likewise, for the MoreApp workload, when the additional request classes create memory contention in the application tier, DC2 detects a change in the service requirement and responds appropriately, whereas THRES does not. For the MoreWeb workload, DC2 detects the change in load at all the tiers and responds more conservatively when scaling up (since there is less database contention), whereas THRES responds only to the localized CPU utilization at the application tier VMs. In summary, while THRES(30,60) can be optimal for the Base workload, it results in SLA violations for the MoreDB and MoreApp workloads, and increased resource consumption for the MoreWeb workload. This indicates that no fixed setting of x and y will be optimal for the four workloads considered. Thus, DC2, in accordance with an embodiment of the present invention, exhibits robustness to changes in workload whereas THRES does not.

The experimental results highlight the advantages of the Kalman filtering approach employed in accordance with embodiments of the present invention. The two important ingredients in the application of embodiments of the present invention (e.g., DC2) that make it robust are: (i) automated inference of underlying system parameters, and (ii) access to end-to-end application-level metrics. Rule-based solutions, such as THRES, lack these properties, making them vulnerable to changes in request patterns and/or workloads. Further, an automated approach such as in the embodiments of the present invention, has the advantage that it does not require any profiling or trial-and-error calibrations. This is crucial in a cloud-based system where the cloud service provider cannot control the user application. In fact, because of the lack of visibility of the user application in a cloud system, cloud service providers cannot leverage the extensive prior work on dynamic application sizing (see below), since such works typically require access to user application for profiling purposes.

A possible implementation of an algorithm in accordance with an embodiment of the present invention has been presented herein. It is to be understood that the embodiments of the present invention are not limited thereto, and may be further modified and/or improved by incorporating more feedback and monitoring information, more sophisticated machine learning techniques, as well as predictions about future request rate. Some of these refinements are discussed below.

It should be noted the only information an implementation of an embodiment of the present embodiment (e.g., DC2) requires about the application is the number of tiers and SLA specifications. The DC2 and other possible implementations do not require any information about the specific software running on each tier or the service requirements of the requests at each tier. The fact that DC2 and other possible implementations of embodiments of the present invention can automatically adapt to the application is demonstrated by their ability to respond to changes in the workload. Likewise, the embodiments of the present invention can automatically adapt to changes in the underlying application, and do not require any information about the VM instance size. Thus, the embodiments of the present invention are agnostic to the application and the hosting environment, and result in a very robust and practical solution.

In the evaluation of THRES, CPU utilization was used as the trigger for scaling actions. While THRES may be augmented to also monitor memory, I/O, network bandwidth, and other resource-level metrics to improve its scaling accuracy, THRES would still fail when faced with multi-tier applications since it would lack information on how each tier affects the underlying application performance. In fact, with more triggers for scaling, THRES would require a relatively large amount of experimentation to optimize its performance. Likewise, if THRES were augmented with application-level metrics such as request rate and response time, an inferencing mechanism, such as Kalman filtering, would be needed to convert that information into useful scaling actions. Without inferencing, THRES would again require experimentation and profiling to determine when scaling should be triggered based on monitored resource and application-level metrics. THRES may be augmented with predictions about a future request rate, but THRES would still require a mechanism to convert that information into scaling actions.

From a cloud service provider's perspective, the known algorithms for scaling applications are not applicable because of the lack of control and visibility into the user's application. In fact, it is this lack of control that has led to the simple rule-based services that are offered by most cloud service providers today. The embodiments of the present invention (e.g., DC2) improve upon rule-based services by automatically determining when and how the scaling actions should be triggered, and executing them successfully in a robust manner.

Figure 7:
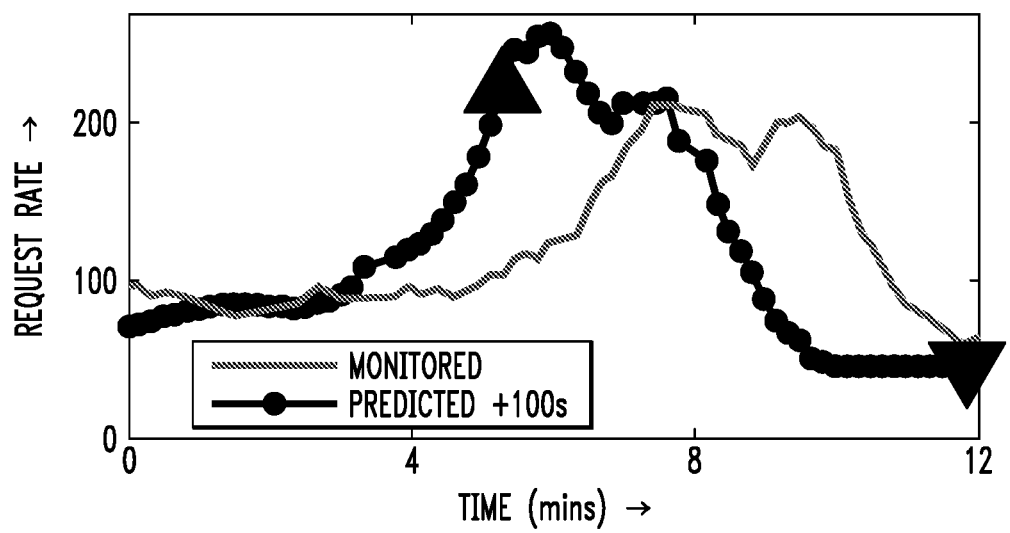
FIG. 7 is a graph showing the monitored and predicted request rates for the scaled-up Hill trace according to an exemplary embodiment of the present invention.
Figure 8:
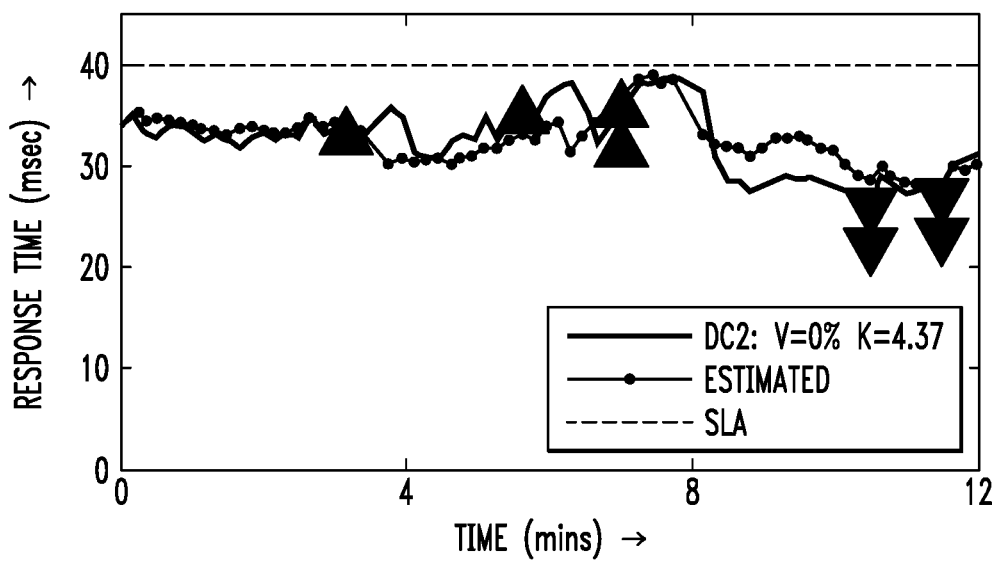
FIG. 8 is a graph showing the performance of an embodiment of the present invention for the scaled-up Hill trace using the MoreWeb workload.

The embodiments of the present invention may have applications beyond those discussed above. According to an embodiment, for cases where a request rate follows a periodic trend, it is possible to accurately predict future request rate based on the observed history. The embodiments of the present invention, for example, DC2, can be integrated with prediction tools to forecast the need for additional VMs in the future. The Hill trace obtained from the WorldCup98 dataset is a periodic trace and is thus a good candidate for prediction. In order to demonstrate prediction-based scaling with DC2, the request rate of the Hill trace was scaled up, and a week's worth of historical data from the WorldCup98 dataset was taken. Autoregressive integrated moving average (ARIMA) modeling was used to predict the request rate 100 seconds into the future. Referring to FIG. 7, the monitored (solid line) and predicted (solid line with dots) request rates are shown. The scaled-up Hill trace exhibits a relatively steep rise in request rate, resulting in SLA violations when using the optimal THRES or native DC2 policies. However, by leveraging the predicted request rate, the need for VMs can be estimated 100 seconds in advance. This allows proactive scaling of capacity to avoid SLA violations. The performance of DC2 integrated with ARIMA modeling is shown in FIG. 8. The up and down triangles represent scaling actions. The stacked triangles represent multiple simultaneous scaling actions. Since DC2 predicts a required number of VMs based on Kalman filtering, it is possible to scale up/down multiple VMs simultaneously, if needed, to quickly provision the desired number of VMs.

Certain cloud service providers, such as, for example, SoftLayer®, offer access to bare-metal instances (PMs), in addition to VMs, to allow customers to create their dedicated cloud. According to an embodiment, in such cases, DC2 or other possible implementation of an embodiment of the present invention, can be employed to manage hypervisor scaling in addition to VM scaling. For example, in the prediction-based scaling use case above, DC2 can be used to proactively estimate the need for new hypervisors. Since each hypervisor in the experimental setup can host 4 application tier VMs, the number of hypervisors is scaled if the estimated number of VMs exceeds the number of VMs that can be hosted on the existing hypervisors. The up and down triangles in FIG. 7 represent hypervisor scale up and scale down actions, respectively.

In general, the addition of a PM can take, for example, anywhere from one hour to one day, depending on the required PM configuration. In the experimental setup discussed herein, a PM is ordered instance via the SoftLayer® API and added it to an OpenStack® deployment via a Chef® server. However, it is not added to the Tomcat™ host aggregate until DC2 issues a hypervisor scaling command, as in FIG. 7.

For multi-tier applications, it is typically necessary to detect the bottleneck tier before making scaling decisions. Adding capacity to the wrong tier can have adverse effects on system performance and cost. According to an embodiment of the present invention, a Kalman filtering based DC2 approach allows for relatively easy detection of a bottleneck tier since it infers the service requirements of the requests at each tier. In order to demonstrate this ability, the MoreDB workload is taken and fraction of requests that stress the database is significantly increases. When using this new workload with the Bursty trace, DC2 does not advocate any scaling actions for the application tier since it detects that the bottleneck is at the database tier. The Kalman filtering model can be extended to also suggest scaling actions for the database and web tiers.

According to an embodiment, DC2 can be employed to analyze what-if decisions proactively. For example, DC2 can relatively easily estimate the change in response time if a certain number of VMs are added or removed. Likewise, since DC2 knows the service requirements of the requests, it can estimate the change in response time if vCPUs are added or removed from the VM instances. An SLA goal may also be changed to allow cost optimization. For example, consider the case where there is access to a range of VM sizes differing in their vCPU and memory configurations, and differing in their rental costs. In this case, a Kalman filtering goal can be changed to ensure response time compliance using the minimum cost (as opposed to minimum number of VMs). Based on this new optimization goal, DC2 or other implementation of an embodiment of the present invention, picks the most cost-effective VM instance when scaling to minimize the VM rental cost.

With the exception of the number of tiers, the systems and methods of the embodiments of the present invention do not require any historical application data or information, and are capable of operating at the level of an application deployment comprising multiple VMs and PMs. In a cloud setting, the cloud service providers typically do not have access to the user application and typically do not have prior knowledge about the service requirements of the user application. Thus, it is not easy to convert the monitored system state to scaling actions. In order to overcome this limitation, the embodiments of the present invention infer the system parameters based on Kalman filtering without requiring access to the user application.

The embodiments of the present invention work on a multi-tier system, and use an inference engine, such as Kalman filtering, to compute the unknown system parameters. Specifically, in accordance with an embodiment, Kalman filtering is leveraged to determine VM and PM scaling actions. Further, the Kalman filtering can be generalized to a three-class, three-tier system, and supplemented with time-series modeling for predicting application resource requirements. The embodiments can also leverage a queuing-based model for making online scalability decisions.

Existing CSP-offered auto-scaling solutions are rule-based and typically require the user to specify the threshold values on the resource usage (e.g., CPU, memory, storage) for triggering scaling actions. While rule-based solutions can be suitable for the cloud environment where the user application cannot be accessed, they ultimately place the burden of the auto-scaling logic on the user. Further, such rule-based approaches have to be tuned to the specific demand pattern and workload for best results, as demonstrated by the THRES policy discussed above. By contrast, the systems and methods of the embodiments of the present invention do not require the user to specify scaling rules, and automatically determine the required scaling actions and execute them in a timely manner to ensure SLA compliance.

FIG. 9 is a flow diagram of a process for scaling a cloud infrastructure, according to an exemplary embodiment of the present invention. The process includes, at block 901, receiving at least one of resource-level metrics and application-level metrics, at block 903, estimating parameters of at least one application based on the received metrics, and at block 905, automatically and dynamically determining directives for scaling application deployment based on the estimated parameters. The determining is performed in response to changing workload demand.

The process further includes at block 907, providing the directives to a cloud service provider to execute the scaling. The process may also include determining placement of a virtual machine on a physical machine based on the directives and at least one of a colocation constraint, an availability constraint and a security constraint.

The estimating is performed using a Kalman filtering technique, wherein using the Kalman filtering technique comprises specifying a generic queuing-theoretic model. The determining is performed without user input about dynamically resizing deployment, and the parameters are unobservable. The scaling is performed to meet performance goals, which can be specified, for example, in an SLA.

Referring back to FIG. 1, according to an embodiment of the present invention, the steps in connection with blocks 901, 903, 905 and 907 can be performed by the modeling and optimization engine 120. An execution engine 130 can determine placement of a virtual machine on a physical machine based on the directives and at least one of a colocation constraint, an availability constraint and a security constraint.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In a cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1018 by one or more data media interfaces. As depicted and described herein, the memory 1028 may include at least one program product having a set (e.g., at least one) of program modules that are configured to carry out the functions of embodiments of the invention.

A program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.)

that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

While the description in connection with FIG. 10 references a cloud computing node 1010, it is to be understood that FIG. 10 can also be representative of a computer system including a computing node 1010, which is not necessarily a cloud computing node, in accordance with which one or more components/steps of the techniques of the invention may be implemented. For example, one or more embodiments can make use of software running on computing node 1010.

Figure 11:
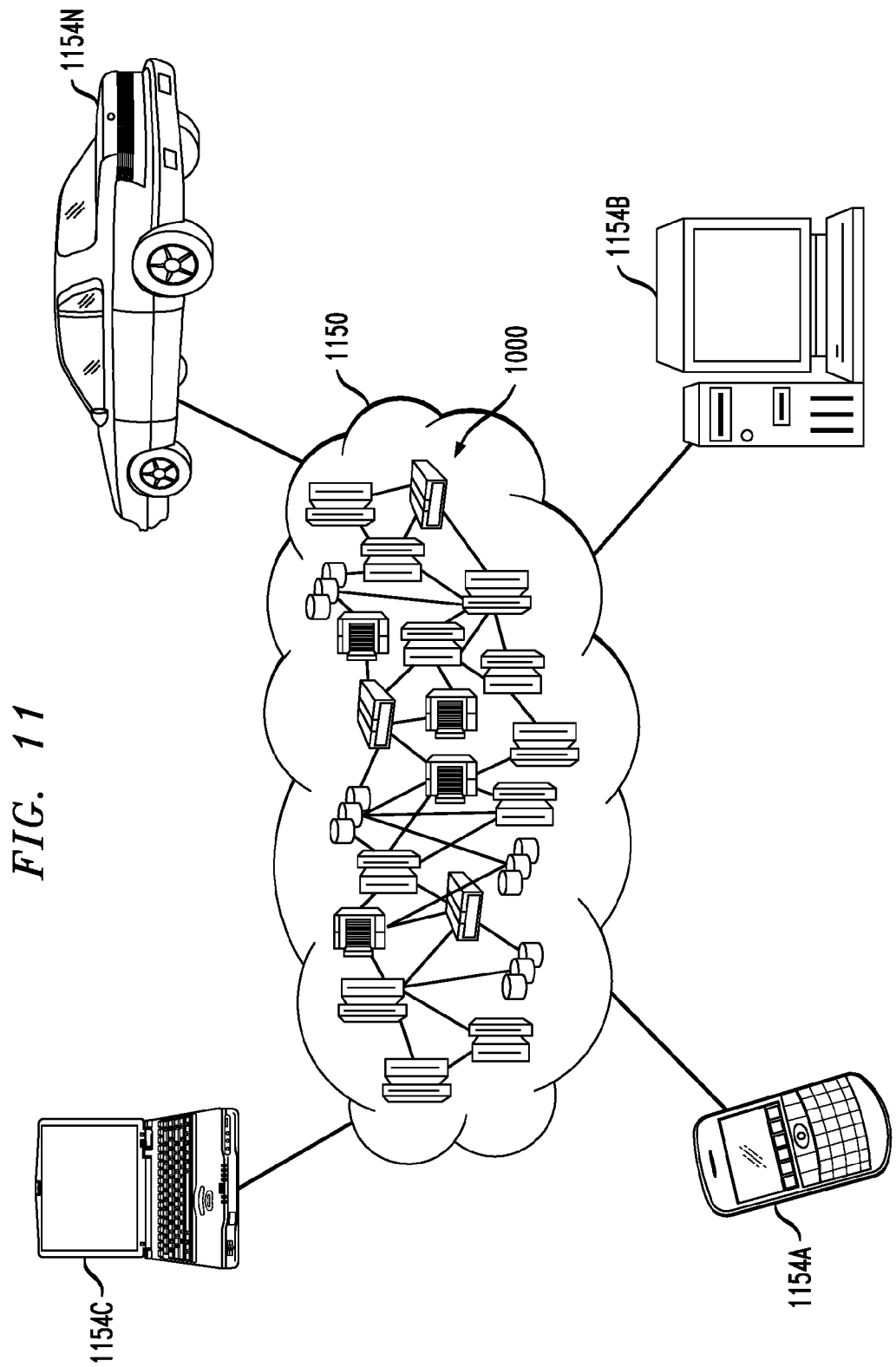
FIG. 11 depicts a cloud computing environment according to an exemplary embodiment of the present invention.

Referring now to FIG. 11, illustrative cloud computing environment 1150 is depicted. As shown, cloud computing environment 1150 comprises one or more cloud computing nodes 1010 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1010 and cloud computing environment 1150 can communicate with any type of computerized device over any type of network and/or network addressable connection (e.g., using a web browser).

Figure 12:
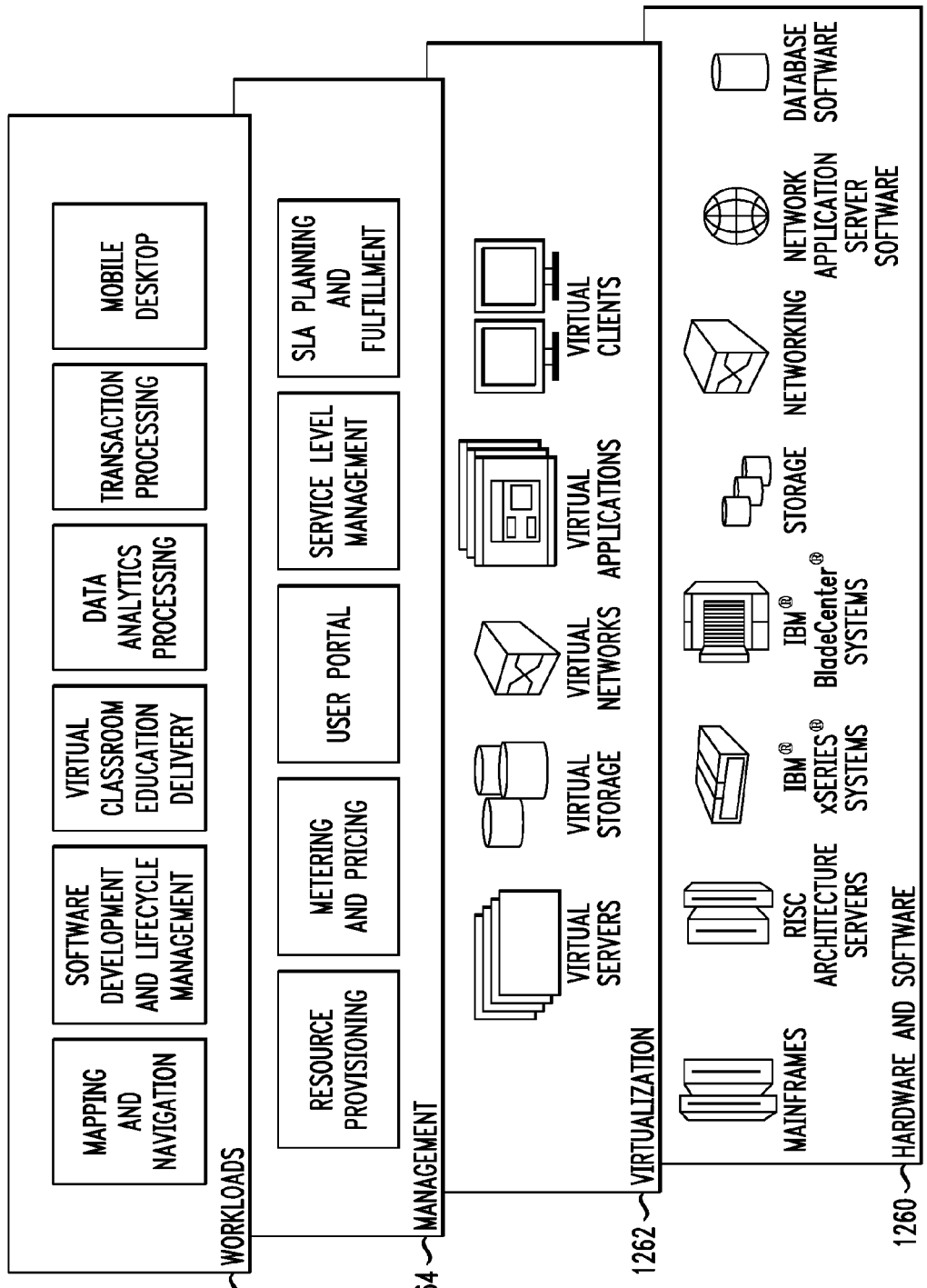
FIG. 12 depicts abstraction model layers according to an exemplary embodiment of the invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Referring back to FIG. 1, components of system architecture 100 may be part of or operatively coupled to one or more layers of the cloud computing environment 1150. For example, in a non-limiting illustrative embodiment, the CloudPool component 103, monitoring agent component 111, modeling and optimization engine 120 and policy-based execution engine 130 may be part of or operatively coupled to at least the management layer 1264. The application owner 101 can access the cloud computing environment 1150 via the user portal in the management layer 1264, and the one or more applications 102, application deployer 105, server 107 and physical machines 109 may be part of or operatively coupled to at least one or more of the hardware and software layer 1260 and the virtualization layer 1262.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The embodiments of the present invention provide design and implementation of a new cloud service, for example, DC2, that automatically scales user applications in a cost-effective manner to provide performance guarantees. Since CSPs do not have complete control and visibility of a user's cloud deployment, the embodiments of the present invention are application-agnostic. In particular, the embodiments do not require any offline profiling or benchmarking of the application nor does it require a deep understanding of the application dynamics. Instead, as noted, the embodiments employ a Kalman filtering technique in combination with a queuing theoretic model to proactively determine the right scaling actions for an application deployed in the cloud using relatively easily available metrics such as utilization and request rate.

Applications of embodiments of the present invention provide a CSP-offered auto-scaling service that is proposed to be superior to existing rule-based offerings. Since the cloud is marketed as a platform designed for all levels of tenants, by utilizing the embodiments of the present invention, application owners who do not have expert knowledge in performance modeling and system optimization should be able to easily scale their applications.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
receiving at least one of resource-level metrics and application-level metrics;
estimating parameters of at least one application based on the at least one of the received resource-level and application-level metrics; and
automatically and dynamically determining directives for scaling application deployment based on the estimated parameters;
wherein at least one of the estimated parameters corresponds to an unobservable parameter of the at least one application and is estimated employing an estimation technique;
wherein the unobservable parameter comprises a background utilization parameter modeling resource utilization at a server due to jobs running on the server; and
wherein the receiving, estimating, and determining steps are performed by a computer system comprising a memory and at least one processor coupled to the memory.

2. The method of claim 1, wherein the determining is performed in response to changing workload demand.

3. The method of claim 1, further comprising providing the directives to a cloud service provider to execute the scaling.

4. The method of claim 1, further comprising determining placement of a virtual machine on a physical machine based on the directives and at least one of a colocation constraint, an availability constraint and a security constraint.

5. The method of claim 1, wherein the estimating is performed using a Kalman filtering technique.

6. The method of claim 5, wherein using the Kalman filtering technique comprises specifying a generic queuing-theoretic model.

7. The method of claim 1, wherein the scaling is performed to meet performance goals.

8. The method of claim 7, wherein the performance goals are specified in a service level agreement.

9. The method of claim 1, wherein the determining is performed without user input about dynamically resizing deployment.

10. The method of claim 1, wherein the directives for scaling comprise one or more directives indicating migration of one or more virtual machines for running the at least one application across one or more physical machines.

11. The method of claim 1, further comprising determining placement of a virtual machine on a physical machine based on the directives and a colocation constraint.

12. The method of claim 1, further comprising determining placement of a virtual machine on a physical machine based on the directives and a security constraint.

13. The method of claim 1, further comprising determining placement of a virtual machine on a physical machine based on the directives and an availability constraint.

14. The method of claim 1, wherein the estimation technique is employed without accessing or modifying the at least one application.

15. The method of claim 1, wherein the unobservable parameter is used to predict future values of server utilization and response time.

16. A method, comprising:
receiving at least one of resource-level metrics and application-level metrics;
estimating parameters of at least one application based on the at least one of the received resource-level and application-level metrics; and
automatically and dynamically determining directives for scaling application deployment based on the estimated parameters;
wherein at least one of the estimated parameters corresponds to an unobservable parameter of the at least one application and is estimated employing an estimation technique;
wherein the unobservable parameter is an existing parameter of the at least one application and hidden from the computer system performing the receiving, estimating, and determining steps; and
wherein the receiving, estimating, and determining steps are performed by a computer system comprising a memory and at least one processor coupled to the memory.

* * * * *